Oct. 31, 1961     H. E. HARING     3,006,821

MANUFACTURE OF SILVER CHLORIDE ELECTRODES

Filed March 29, 1945

INVENTOR
H. E. HARING
BY
Edwin B. Cave
ATTORNEY

United States Patent Office 3,006,821
Patented Oct. 31, 1961

3,006,821
MANUFACTURE OF SILVER CHLORIDE ELECTRODES
Horace E. Haring, Summit, N.J., assignor to Bell Telephone Laboratories, Incorporated, New York, N.Y., a corporation of New York
Filed Mar. 29, 1945, Ser. No. 585,417
6 Claims. (Cl. 204—38)

This invention relates to methods of forming electrodes for electric cells. More particularly, this invention relates to methods of forming silver chloride electrodes in which the silver chloride is carried on a metallic base, particularly a base of metallic silver.

Silver chloride electrodes have been proposed as cathodes in electric cells using various electrolytes and anodic materials. The present invention provides convenient methods of manufacturing such electrodes and of manufacturing electrodes of novel structure which are capable of carrying much higher current densities than the electrodes hitherto proposed and which become fully active as to their current carrying capacity and their contribution to cell voltage much more quickly than has been heretofore possible.

Silver chloride is a substantially non-conductive material. Therefore electrodes embodying this material must have a current collecting framework of conductive material. Although it is commonly supposed that the reduction of silver chloride to silver takes place directly in the operation of silver chloride cells, it can be demonstrated that the reduction of the electrode takes place through the continuous dissolution of the silver chloride in the electrolyte immediately adjacent the conductive base and the simultaneous deposition of the silver ions as metallic silver upon the conductive base, the chloride ions remaining in solution.

Therefore, the reduction of a silver chloride electrode must be treated as a plating process. Since the current generating capacity of the electrode in a cell is dependent upon the rate at which the metallic silver is plated, it is essential that large areas of the conductive framework be exposed to the electrolyte and that large areas of silver chloride exist in contact with the electrolyte in close proximity to the conductive framework if a virtually instantaneous peak cell voltage and high current carrying capacity are required.

According to the preferred procedure of the present invention, a silver chloride electrode is formed by depositing a layer of silver chloride upon a silver base, such as a screen or sheet having a silver surface by immersing the silver base as an anode in a solution containing chloride ions. Although preferably the silver base is solid silver, a base of some other metal, such as copper, having a relatively heavy plate of silver may be used. The quantity of silver chloride formed, and therefore the capacity of the electrode, is determined by the number of ampere minutes of formation. After the desired number of ampere minutes have passed through the silver base the anodizing current is discontinued.

The electrode made up of a silver base carrying silver chloride is then treated to produce exposed areas of metallic silver electrically connected by silver filaments to the silver base. These exposed areas of metallic silver are joined by lightly silvering the entire surface of the electrode and this conductive system together with the silver base serves as the current collecting framework referred to above.

In order to compact the silver chloride coating and give it mechanical strength, the electrode is subjected to a high mechanical pressure, as in a hydraulic press. This pressing operation may be carried out at any time after the formation of the silver chloride coating.

To produce an electrode capable of generating an extremely high current density, a porous silver base such as a fine mesh of fine silver wire is usually used. This base, preferably a silver screen, may be suspended as an anode in a suitable electrolyte as described above until the desired amount of silver chloride has been deposited. The most satisfactory results upon anodizing are obtained if the silver base, and particularly silver screen, is annealed prior to anodizing. Annealing at a temperature of about 600° C. for about thirty minutes has been found suitable. In the absence of annealing, non-uniformity of the metal due to mechanical stress in manufacture causes non-uniform anodizing. The anodizing procedure and the changes taking place in the various stages of the process of preparing the electrode are illustrated in the accompanying drawing in which:

Figure 1:
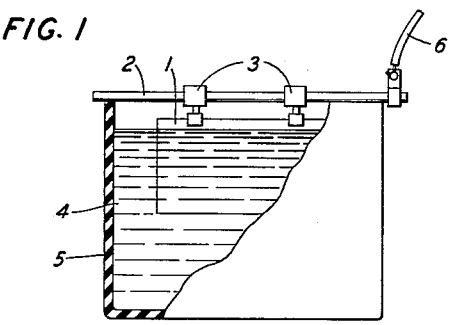
FIG. 1 is a front elevation, partly in section, of an apparatus which may be used for anodizing.

In FIG. 1 the silver screen 1 or other silver body is suspended by means of the rack 2 and clamps 3 in the electrolyte 4 contained in the insulated tank 5. The mesh is connected to a suitable current source by the conductive means 6. Suitable electrodes of opposite polarity (not shown) are suspended in the electrolyte in such position as to provide a uniform current distribution over the surface of the silver body.

Any suitable aqueous electrolyte containing chloride ions may be employed in the anodizing operation. An aqueous solution of sodium chloride or hydrochloric acid has been found satisfactory. The concentration of the solution should be sufficient to give the desired conductivity. The upper limit of the concentration is set only by the value at which the solubility of the silver chloride formed becomes undesirably high at the temperature of the solution so that the rate of deposit of silver chloride becomes too slow and an undesirable amount passes into the solution. Ordinarily an aqueous solution in which the chloride ions constitute in the vicinity of 2 percent by weight of the solution will be found satisfactory.

In order to increase the rate at which the formation of silver chloride takes place it has been found desirable to heat the electrolyte above room temperatures. Temperatures between about 60° C. and 80° C., and preferably of about 75° C. are the most suitable. This use of elevated temperatures also considerably improves the physical properties of the deposit.

Another expedient which may be employed to decrease still further the time required for anodizing is to add to the electrolyte a low concentration of anions which will form with silver a compound more soluble than silver chloride. Fluoride ions or preferably nitrate ions may be employed for this purpose. Nitrate ions may be added in the form of nitric acid at the rate of 5 cubic centimeters of concentrated nitric acid per square foot of screen.

The anodizing potential and current density are not critical and the most desirable values can readily be determined by those skilled in the art. A potential of about 18 volts has been found satisfactory for all purposes. The anodizing is continued until slightly more than the desired number of ampere minutes to be generated by the cell have passed through the screen.

In order to provide a convenient means for electrical connection to the finished electrode, it is desirable that a portion of the silver base remain uncoated with silver chloride. This is accomplished most simply by coating such portions with a non-conductive lacquer. This expedient is desirable even when the portion which is to remain unanodized extends out of the electrolyte, since in the absence of a lacquer coating at the water line the electrolyte tends to creep up the silver base and evaporate, thus forming a line of high electrolyte concentration at which the anodizing proceeds at a faster rate than below the surface of the electrolyte bath. This rapid anodization at the water line causes the silver base to be converted too rapidly thus resulting in a line of mechanical weakness. A coating of lacquer extending well above and below the water line avoids this difficulty. After the preparation of the electrode has been completed, the lacquer coating may be removed by mechanical means to the extent necessary to permit good electrical contact.

Figure 2:
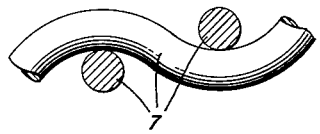
FIG. 2 is a diagrammatic representation, in section, of a portion of a silver screen prior to anodizing.
Figure 3:
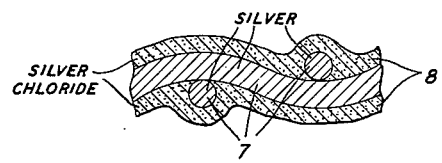
FIG. 3 is a diagrammatic representation, in section, of the same silver screen after anodizing.

FIGS. 2 to 6 show in a purely diagrammatic manner the changes taking place during the various stages of the preparation of the electrode. The outer sections of the wires 7 of the initial silver screen shown in FIG. 2 are, during the anodizing operation referred to above, converted to a silver chloride layer 8, as shown in FIG. 3. After being anodized the screen is suspended for a short period as a cathode in any suitable electrolyte which will not have a harmful effect on the silver chloride coating.

This cathodizing operation may be carried out simply by reversing the polarity of the electrodes in the apparatus shown in FIG. 1. Preferably, however, the screen is removed from this apparatus and suspended as a cathode in an aqueous solution of sodium chloride for the required period of time. A solution containing about 5 percent of sodium chloride has been found very suitable. Obvious, other electrolytes may be employed.

This cathodizing operation usually is carried out at or above the current density at which the cathode is intended to be discharged in the cell in which it is to be employed. This operation is made very brief, e.g. 4 to 5 seconds, so that only a minimum of the capacity of the electrode is destroyed by reduction of the silver chloride to metallic silver.

Figure 4:
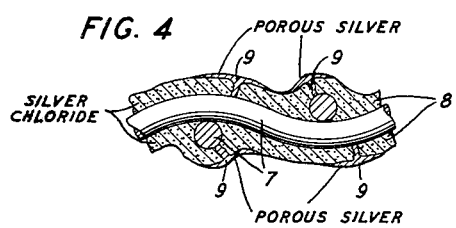
FIG. 4 is a diagrammatic representation, in section, of the anodized silver screen of FIG. 3 after silver filaments have been caused to grow out from the base silver by cathodic reduction.

During this operation, filamentary bridges 9 of porous metallic silver connecting the wires 7 of the mesh with the outer surface of the silver chloride layer are formed by the reduction of the walls of pores through the silver chloride coating, as shown in FIG. 4. At the surface of the silver chloride these filamentary bridges tend to spread out to a certain extent, creating the appearance of snowflakes.

Figure 5:
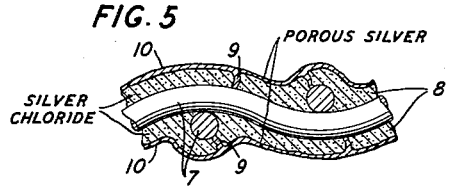
FIG. 5 is a diagrammatic representation, in section, of the anodized and then cathodically treated screen of FIG. 4 after silvering by immersion in a reducing solution.
Figure 6:
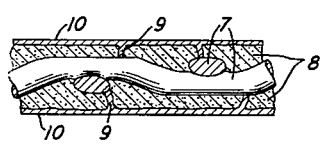
FIG. 6 is a diagrammatic representation, in section, of the body in FIG. 5 after being subjected to mechanical pressure.

The screen is then immersed in a suitable reducing agent adapted to reduce chemically the entire outer surface of the silver chloride to a conductive layer 10 of porous silver as shown in FIG. 5. This reduced surface 10 connected by the bridges 9 to the inner silver wires 7 constitutes a very effective current collecting framework which will enable the immediate generation of extremely high current densities in cells employing this electrode.

One of the most effective reducing agents for the formation of this conductive layer on the silver chloride is an aqueous solution of hydroxylamine. One reason for the particular effectiveness of this substance is the fact that a quantity of gas is continuously generated at the surface of the silver chloride as a product of the reducing action. The evolution of this gas serves to induce local agitation of the reducing solution making unnecessary the supplementary mechanical agitation required for best results with other reducing agents.

Other suitable reducing agents are aqueous solutions of any of the common photographic developers, such as p-aminophenol, o-aminophenol, amidol (2,4-diaminophenol hydrochloride), metol (p-methylaminophenol sulfate), catechol or hydroquinone. The concentrations which are common for photographic developing are suitable and the pH of the solutions should be adjusted as in photographic developing solutions. Immersion for one to three minutes is ordinarily satisfactory. The exact time depends upon the dilution, temperature and age of the developing solution.

A particularly effective reducing solution of the photographic developer type contains in each liter of aqueous solution, approximately 1.5 grams of hydroquinone, 0.5 gram of elon (p-methylaminophenol sulfate), 6 grams of anhydrous sodium sulfite, and 9 grams of anhydrous sodium carbonate.

Figure 7:
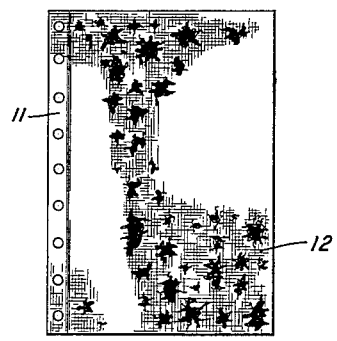
FIG. 7 is a front elevation of a finished electrode prepared according to the process of the present invention.

In order to consolidate and impart mechanical strength to the silver surfaced silver chloride coating, the mesh is subjected to a high mechanical pressure, such as three to four tons per square inch, to form a compact electrode, e.g. two-thirds its former thickness. The finished electrode has the appearance of a solid silver sheet flecked with silver snowflakes caused by the arrangement of the silver bridges as illustrated in FIG. 7. In this figure the edge 11 consists of uncoated silver screen and may be used for making electrical contact with the electrode. The remainder 12 of the electrode is coated with silver chloride and reduced silver as described above. The cross-sectional appearance of the finished sheet is represented diagrammatically in FIG. 6. Electrodes having this structure and cells containing them are more particularly described and claimed in the application of H. E. Haring, Serial No. 585,418, filed on the same day as the present application.

As indicated above the pressing operation may be performed at any time after the anodizing operation. Thus the electrode may be subjected to mechanical pressure immediately after anodizing and before the subsequent reducing operations, or it can be pressed after cathodic reduction and before the chemical surface reduction or it can be pressed after all three operations have been completed. When the initial silver chloride coating is applied by a procedure, other than anodizing, which yields a compact mechanically durable layer of silver chloride, it is obvious that no further pressing operation is required.

The manufacture of electrodes has been described above as applied to silver screen. The process of the present invention is applicable to other silver bases such as silver sheets, either perforate or imperforate, and grids of silver or silver plated metal. A desirable base for some purposes consists of silver sheets pierced at regular intervals with small holes, the metal displaced by the piercing operation projecting in the form of sharp protuberances from the surface of the sheet so as to resemble a grater.

The procedures of electrolytic and chemical reduction described above may be carried out with silver bases coated with silver chloride by methods other than anodizing. Any coating procedure which produces a coating which is sufficiently porous to permit electrolytic reduction of the walls of the pores to form the required filamentary bridges of silver, as described above, will be suitable. Thus a suitable silver chloride coating may be formed on silver screen by pressing, preferably hot pressing, a layer of finely divided silver chloride onto the surface. An adequate coating can also be produced by pasting powdered silver chloride into a silver grid with a suitable binder such as gum arabic.

The invention has been described in terms of its specific embodiments, which are to be considered illustrative only and not to be a limitation upon the scope of the invention, which is to be limited only by the scope of the appended claims.

What is claimed is:

1. The process of preparing an electrode for an electric cell which comprises anodizing the surface of a silver body by passing an electric current, in a direction such that the body acts as an anode, between a cathode and said silver body through an aqueous electrolyte containing chloride ions while the silver body is immersed therein until a layer of silver chloride has been deposited on the surface of said body, passing an electric current, in a direction such that said body acts as a cathode, between said anodized silver body and an anode through an aqueous electrolyte in which the silver body is immersed until a portion of said silver chloride has been reduced to form a plurality of conductive filamentary bridges of metallic silver extending between the surface of the silver body and the external surface of the silver chloride layer and immersing said body in a solution of a reducing agent capable of reducing the silver chloride to metallic silver upon contact until a thin layer of porous metallic silver has been formed on the surface of the silver chloride.

2. The process as described in claim 1 including the step of compacting the deposited silver chloride layer against said silver body by mechanical pressure at some stage of the process after the initial formation of the silver chloride layer.

3. The process as described in claim 1 wherein the aqueous electrolyte used for anodizing is maintained at a temperature between about 60 degrees C. and about 80 degrees C. during the anodizing operation.

4. The process as described in claim 1 wherein the aqueous electrolyte used for anodizing contains nitrate ions.

5. A process for preparing an electrode for an electric cell which comprises anodizing the surface of an annealed silver screen by passing an electric current, in a direction such that the screen acts as an anode, between said screen and a cathode through an aqueous electrolyte containing chloride ions while said screen is immersed therein until a layer of silver chloride has been deposited on the surface of said screen, said electrolyte being maintained at a temperature between about 60 degrees C. and about 80 degrees C. during said anodizing operation, passing an electric current, in a direction such that said screen acts as a cathode, between said anodized silver screen and a cathode through an aqueous electrolyte in which said screen is immersed until a portion of said silver chloride has been reduced to form a plurality of conductive filamentary bridges of metallic silver extending between the silver screen and the external surface of the silver chloride layer and immersing said screen in a solution of a reducing agent capable of reducing silver chloride to metallic silver upon contact until a thin layer of porous metallic silver has been formed on the surface of said silver chloride.

6. The process described in claim 5 wherein the solution of reducing agent is an aqueous solution of hydroxyl amine.

References Cited in the file of this patent

UNITED STATES PATENTS

| | | |
|---|---|---|
| 7,821 | Mathiot | Dec. 10, 1850 |
| 26,978 | Edwards | Jan. 31, 1860 |
| 303,237 | Skrivanow | Aug. 5, 1884 |
| 405,196 | Barrett et al. | June 11, 1889 |
| 434,593 | Fink | Aug. 19, 1890 |
| 512,055 | Pearson | Jan. 2, 1894 |
| 1,442,238 | Smith | Jan. 16, 1923 |
| 2,422,323 | Waltman | June 17, 1947 |

OTHER REFERENCES

Trans. Electrochem. Soc., vol. 72 (1937), pages 63.